Patented May 1, 1945

2,375,086

UNITED STATES PATENT OFFICE 2,375,086

PROCESS OF PREPARING CONJUGATED DIOLEFINS

Harold Simmonds Davis, Riverside, Conn., assignor to American Cyanamid Company, New York, N. Y., a corporation of Maine No Drawing. Application September 28, 1940,
Serial No. 358,833

6 Claims. (Cl. 260—681)

This invention relates to methods of producing conjugated diolefins and more particularly to the production of conjugated diolefins useful in the production of synthetic elastomers such as 1,3-butadiene, isoprene, and the like.

It has been proposed in the past to prepare 1,3-butadiene by dehydration of 1,3-butylene glycol. The process produces fair yields of butadiene but is not commercially attractive except where the price of butadiene is sufficiently high because 1,3-butylene glycol is rather expensive to prepare.

Various attempts have been made to improve the process of producing conjugated diolefins by using esters instead of the glycols. Thus for example, mono-esters of dimethyl ethylene carbinol have been pyrolysed to produce isoprene. In other words, the elements of the acid have been split out to add an additional double bond. In a similar manner, diesters of 1,3-butylene glycol have been pyrolysed to produce 1,3-butadiene and the process operates smoothly but is not of material interest because of the fact that the esters of 1,3-butylene glycol are even more expensive to produce than the glycol itself.

Experiments have been made in the past with other butylene glycols in which the hydroxy groups are on adjacent carbon atoms such as the 1,2- and 2,3-glycols. In every case other compounds were produced; the 1,2-butylene glycol tends to produce butyraldehyde and the 2,3-glycol mainly methylethyl ketone. Even 1,4-butylene glycol will not produce butadiene on dehydration but results in ring closure producing tetrahydrofuran. Accordingly, of the butylene glycols, only one—the 1,3 isomer—is used in making 1,3-butadiene by dehydration, and the price of butadiene therefore remained high as the 1,3-glycol is quite materially more expensive than glycols in which the hydroxy groups are attached to adjacent carbon atoms, particularly the 2,3 isomer.

According to the present invention I have found that when the esters are pyrolysed instead of the glycols themselves, the esters of glycols having ester groups on adjacent carbon atoms yield conjugated diolefins and as the esters of 2,3-butylene glycol can be produced very cheaply from butylene oxide and the yields on pyrolysing are good, a material saving in the cost of such conjugated diolefins as 1,3-butadiene, isoprene, and the like results.

The pyrolysis of the esters may be effected in either the vapor phase or the liquid phase. In general, the vapor phase process is suitable for more volatile esters such as acetates, whereas in the case of less volatile esters the liquid phase process is preferable.

The present invention is not limited to any particular ester. Thus, diolefins are obtainable from lower fatty esters such as the acetates, substituted fatty esters, higher fatty esters, esters with aromatic acids, and the like. Yields will vary with the particular esters, being highest with the esters of monocarboxylic fatty acids and the lowest with aromatic polycarboxylic acid esters such as the phthalate.

In the vapor phase process where lower fatty esters such as the acetates are used the process operates over a considerable range of temperature. In the main practical operating results can be obtained with temperatures between 490–620° C. The reaction proceeds very rapidly at the high temperatures, but above 550° C. the yield drops off to some extent, and below 490° C. the reaction rate is slow and the efficiency of the process drops.

The action does not appear to be catalytic in nature as the results with empty glass and quartz tubes are as good as when catalytic metal oxides are employed. This is an advantage of the process because no particular catalyst is needed and no problems incident to catalyst poisoning are encountered.

Liquid phase cracking which is used with higher boiling esters is effected at lower temperatures, in general between about 225°–325° C. The range is not critical and it is an advantage that the process is not sensitive to changes in pyrolysis temperatures.

The present invention will be described in greater detail in conjunction with the following specific examples which illustrate typical embodiments thereof.

*Example 1*

2,3-butylene glycol diacetate was passed through reactors consisting of empty glass tubes at different temperature ranges and different contact times. The following table gives the results obtained.

| Test No. | Pyrolysis temp. range | Approx. contact time | Per cent yield acetic acid | Per cent yield product |
|---|---|---|---|---|
| | °C. | Seconds | | |
| 1 | 540–560 | 29 | 91.5 | 67.2 |
| 2 | 520–525 | 18 | 91.2 | 75.2 |
| 3 | 515–530 | 8 | 91.7 | 75.3 |
| 4 | 490–505 | 13 | 85.0 | 69.2 |

It will be apparent that the highest yields are obtained at temperatures in the range of 515–530° C. with fairly short contact times and at the higher temperatures, namely 540–560° C., there is a material dropping off of yield although it is still high, and a similar effect is also noted where the temperature goes down as low at 490° C.

The 1,3-butadiene was identified by the melting point of its maleic anhydride addition product and showed in each case that the product was 1,3-butadiene. It will also be noted that an excellent recovery of acetic acid was obtained which can be used to produce fresh amounts of the diacetate.

Example 2

1,2-butylene glycol diacetate was pyrolysed at about 550° C. with a 20 second contact time and a yield of approximately 50% of 1,3-butadiene was obtained with a 76% yield of acetic acid from the pyrolysis. Loss as gases was very small being only about 4 or 5%. The unpyrolysed material can be recycled improving the total yield.

Example 3

Trimethyl ethylene glycol diacetate was pyrolysed at about 550° C. with contact time of approximately 23 seconds. A yield of 43% of isoprene was obtained with about 10% loss as gas and a 90% recovery of acetic acid.

Example 4

2,3-butylene glycol di-(monochloracetate) was pyrolysed at 510–520° C., contact tie of approximately 20 seconds, and a yield of 47% 1,3-butadiene was obtained. The recovery of acid was not as good as with the unchlorinated ester.

Example 5

2,3-butylene glycol dioleate was pyrolysed in the liquid phase by heating at 270–310° C. and recovering volatile matters given off until no substantial further pyrolysis resulted. An approximate yield of 63% of 1,3-butadiene was obtained.

Example 6

2,3-butylene glycol distearate was pyrolysed by heating in the liquid phase at temperatures between 240–325° C. in a manner similar to that described in the preceding example and a yield of 78% of 1,3-butadiene was obtained.

Example 7

2,3-butylene glycol dibenzoate was pyrolysed at temperatures between 225–245° C. and a yield of 45% of 1,3-butadiene was obtained.

Example 8

2,3-butylene glycol phthalate was pyrolyzed at 280–284° C. with a yield of 1,3-butadiene of approximately 28% contaminated with a little methylethyl ketone.

Example 9

1,3-butadiene was produced by a cyclic process starting with 2,3-butylene glycol diacetate, recovering the acetic acid in each cycle and adding sufficient acid to make up the loss, utilizing this acid mixture as an esterification mixture to produce additional amounts of 2,3-butylene glycol diacetate. The results were as follows:

| Test No. | Esterification | | | | | Pyrolysis | | | | |
|---|---|---|---|---|---|---|---|---|---|---|
| | Glycol, gm. | CH$_3$COOH, gm. | Water, gm. | | Per cent yield of ester | Butadiene, gm. | Per cent yield butadiene based on— | | CH$_3$COOH recovery per cycle | |
| | | | Theo. | Actual | | | Glycol | Ester | Gm. | Per cent |
| 1 | | | | | | 59 | 71.0 | 74.8 | (149) | (85.2) |
| 2 | 130 | 205 | 52 | 45.3 | 86.9 | 44 | 56.9 | 64.4 | 175 | 85.4 |
| 3 | 130 | 205 | 52 | 44.0 | 84.6 | 52 | 65.9 | 78.1 | 172 | 84.1 |
| 4 | 130 | 205 | 52 | 46.5 | 89.5 | 50 | 63.4 | 70.8 | 177 | 86.4 |
| 5 | 130 | 205 | 52 | 46.9 | 90.3 | 52 | 65.9 | 74.4 | 176.5 | 86.1 |
| 6 | 130 | 205 | 52 | 47.0 | 90.4 | 51 | 64.7 | 71.6 | 179 | 87.3 |

It will be apparent from this process that there is no tendency to build up small amounts of impurities which adversely affect the procedure and therefore the recovery of acetic acid per cycle represents a net recovery since it is not necessary to reject the acetic acid after a number of cycles have occurred. In commercial operation, of course, the recovery of acid is of vital interest to the economics of the process.

In Examples 5–9 the ester used was not isolated in the pure form but was used as obtained from azeotropic esterification containing some of the hydrocarbon used for azeotropic removal of water. The hydrocarbon used was benzene and in one case xylene. No loss in efficiency was noted when a pure esterification product was pyrolysed. It is an advantage of the present process that it is not necessary to use highly purified materials which reduces the cost of the process materially. No difficulties arise in obtaining pure butadiene as it distills off uncontaminated with other volatile matter except in the case of the phthalate where some methylethyl ketone was produced. However, the boiling point of the 1,3-butadiene and methylethyl ketone are sufficiently far apart so that a sharp separation presented no problem.

The invention has been described particularly in conjunction with the production of 1,3-butadiene and isoprene as these are the most important conjugated diolefins used in the production of elastomers. The invention is not, however, limited to the production of these conjugated diolefins but can be used generally to produce other conjugated diolefins of higher molecular weight.

What I claim is:

1. A method of producing conjugated diolefins which comprises subjecting a high boiling diester of a glycol, said glycol containing at least four carbon atoms and said diester having the ester groups attached to adjacent carbon atoms, to pyrolysis in the liquid phase at temperatures between 225 and 325° C. and recovering the diolefin produced.

2. A method of producing conjugated diolefins which comprises subjecting a high boiling diester of a higher fatty acid with a glycol containing at least four carbon atoms, the ester groups being attached to adjacent carbon atoms, to pyrolysis in the liquid phase at temperatures between 225 and 325° C. and recovering the diolefin produced.

3. A method of producing 1,3-butadiene which comprises subjecting a diester of a butylene glycol with a high boiling fatty acid, the ester groups being attached to adjacent carbon atoms to pyrolysis in the liquid phase at temperatures between 225 and 325° C. and recovering the 1,3-butadiene produced.

4. A method of producing 1,3-butadiene which comprises subjecting a diester of a 2,3-butylene glycol with a high boiling fatty acid to pyrolysis in the liquid phase at temperatures between 225 and 325° C. and recovering the 1,3-butadiene produced.

5. A method of producing 1,3-butadiene which comprises subjecting a diester of a 2,3-butylene glycol dioleate to pyrolysis in the liquid phase at temperatures between 225 and 325° C. and recovering the 1,3-butadiene produced.

6. A method of producing 1,3-butadiene which comprises subjecting a diester of a 2,3-butylene glycol distearate to pyrolysis in the liquid phase at temperatures between 225 and 325° C. and recovering the 1,3-butadiene produced.

HAROLD SIMMONDS DAVIS.